(12) United States Patent
Ghose et al.

(10) Patent No.: US 11,845,834 B2
(45) Date of Patent: Dec. 19, 2023

(54) POLYAMIDE COMPOSITIONS AND ARTICLES INCORPORATING THE SAME

(71) Applicant: The Boeing Company, Chicago, IL (US)

(72) Inventors: Sayata Ghose, Sammamish, WA (US); Marcus Anthony Belcher, Sammamish, WA (US); John W. Connell, Yorktown, VA (US)

(73) Assignees: The Boeing Company, Arlington, VA (US); United States Government, as Represented by the Administrator of the National Aeronautics and Space Administration, Washington, DC (US)

( * ) Notice: Subject to any disclaimer, the term of this patent is extended or adjusted under 35 U.S.C. 154(b) by 117 days.

(21) Appl. No.: 17/444,117

(22) Filed: Jul. 30, 2021

(65) Prior Publication Data

US 2022/0089817 A1   Mar. 24, 2022

Related U.S. Application Data

(60) Provisional application No. 63/082,390, filed on Sep. 23, 2020.

(51) Int. Cl.
*C08G 69/32* (2006.01)
*B30B 3/00* (2006.01)
(Continued)

(52) U.S. Cl.
CPC .............. *C08G 69/32* (2013.01); *B30B 3/005* (2013.01); *B30B 9/28* (2013.01); *C08K 3/013* (2018.01);
(Continued)

(58) Field of Classification Search
CPC .......... C08G 69/32; C08K 3/013; C08K 5/09; C08K 2201/001; B30B 3/005; B30B 9/28; B29C 70/382
(Continued)

(56) References Cited

U.S. PATENT DOCUMENTS 4,080,319 A   3/1978   Caporiccio et al.
4,931,530 A   6/1990   Fukawa et al.
(Continued)

FOREIGN PATENT DOCUMENTS

EP   0397021 A2      11/1990
EP   1842879 A1  *  10/2007   .............. C08L 77/00
(Continued)

OTHER PUBLICATIONS

Ghose et al., "Thermal conductivity of ethylene vinyl acetate copolymer/nanofiller blends," Composites Science and Technology 68 (2008) 1843-1853.
(Continued)

*Primary Examiner* — David T Karst
(74) *Attorney, Agent, or Firm* — MH2 Technology Law Group LLP

(57) ABSTRACT

Compositions including a polyamide, and compaction rollers for an automated fiber placement machine incorporating the composition are provided. The polyamide may be a reaction product of at least one diamine and an aromatic dicarboxylic acid, a hydroxy benzoic acid, or their respective ester or acyl halide derivatives. The at least one diamine may include an amino terminated perfluorinated alkyl ether polymer or oligomer. The composition may have a thermal conductivity of from about 0.2 to about 50 Watts per meter Kelvin ($Wm^{-1}K^{-1}$).

20 Claims, 1 Drawing Sheet

(51) Int. Cl.
*B30B 9/28* (2006.01)
*C08K 5/09* (2006.01)
*C08K 3/013* (2018.01)
*B29C 70/38* (2006.01)

(52) U.S. Cl.
CPC .............. *C08K 5/09* (2013.01); *B29C 70/382* (2013.01); *C08K 2201/001* (2013.01)

(58) Field of Classification Search
USPC ........................................................ 528/348
See application file for complete search history.

(56) References Cited

U.S. PATENT DOCUMENTS

| | | | |
|---|---|---|---|
| 5,051,313 | A | 9/1991 | Economy et al. |
| 7,678,879 | B2 * | 3/2010 | Dershem .............. C07C 235/50 |
| | | | 428/40.1 |
| 8,741,084 | B2 | 6/2014 | Kisch et al. |
| 9,550,911 | B2 | 1/2017 | Wohl et al. |
| 9,822,088 | B2 | 11/2017 | Wohl et al. |
| 9,901,018 | B1 * | 2/2018 | Richmond ............. H01B 13/24 |
| 10,125,218 | B2 | 11/2018 | Wu et al. |
| 2002/0026006 | A1 | 2/2002 | Garcia et al. |
| 2004/0022981 | A1 * | 2/2004 | Hu ........................... C08K 7/24 |
| | | | 428/408 |
| 2008/0312382 | A1 | 12/2008 | Kausch et al. |
| 2011/0003118 | A1 | 1/2011 | Ohtsu et al. |
| 2011/0152435 | A1 * | 6/2011 | Morishita .............. B82Y 30/00 |
| | | | 977/788 |
| 2012/0076973 | A1 | 3/2012 | Guzman et al. |
| 2013/0207029 | A1 * | 8/2013 | Janssen .................... C08K 3/04 |
| | | | 252/75 |
| 2013/0320272 | A1 | 12/2013 | Wu et al. |
| 2015/0083961 | A1 | 3/2015 | Mrozek et al. |
| 2015/0344748 | A1 * | 12/2015 | Wohl ................. C08G 59/1438 |
| | | | 427/512 |
| 2016/0280858 | A1 | 9/2016 | Connell et al. |
| 2016/0326318 | A1 * | 11/2016 | Tonelli ....................... C08J 5/00 |
| 2017/0158908 | A1 | 6/2017 | Doss et al. |
| 2020/0283574 | A1 | 9/2020 | Ahuja et al. |
| 2022/0017697 | A1 | 1/2022 | Ghose et al. |
| 2022/0106441 | A1 | 4/2022 | Ghose et al. |

FOREIGN PATENT DOCUMENTS

| | | | | |
|---|---|---|---|---|
| GB | 543843 | A * | 3/1942 | ............. C08G 69/26 |
| JP | 8390270 | B2 | 3/2003 | |
| KR | 1020080055544 | A | 6/2008 | |
| WO | 2014091350 | A2 | 6/2014 | |
| WO | 2019/043142 | A1 | 3/2019 | |

OTHER PUBLICATIONS

Wang et al., "Synthesis and properties of fluorinated polyimides with multi-bulky pendant groups," RSC Advances, vol. 7, 2017 (First published May 17, 2017), pp. 26420-26427 (19 pages).

Shaver et al., "Fluorinated Poly(arylene ether ketone)s for High Temperature Dielectrics," Polymer 83 (2016) 199-204.

* cited by examiner

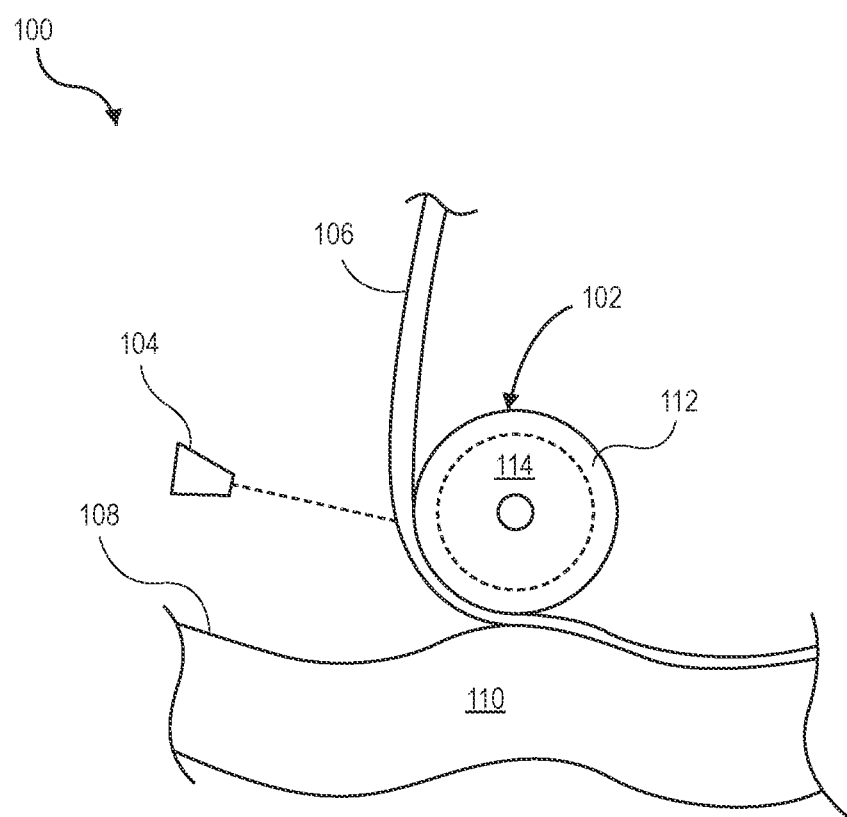

POLYAMIDE COMPOSITIONS AND ARTICLES INCORPORATING THE SAME

CROSS-REFERENCE TO RELATED APPLICATIONS

This application claims priority to U.S. Provisional Patent Application No. 63/082,390, filed on Sep. 23, 2020, the disclosure of which is incorporated herein by reference in its entirety.

STATEMENT OF GOVERNMENT INTEREST

This invention was made with Government support under (SAA1-21157; SAA1-21157, Annex 17; and SAA1-21157, Annex 17, MOD 1) awarded by NASA. The government has certain rights in this invention.

The invention described herein may be manufactured and used by or for the U.S. Government for U.S. Government purposes without the payment of royalties thereon or therefor.

TECHNICAL FIELD

The present disclosure relates to the field of polyamide compositions, composites thereof, and articles of manufacture incorporating the same, more particularly, to components, such as compliant components for automated fiber placement machines.

BACKGROUND

Fabricating relatively large, highly contoured structures from composite materials for aerospace primary structures is challenging and thus is largely limited to hand layup techniques that are not only labor intensive but may not be well suited for high production volume applications. Automated fiber placement (AFP) machines may be used to fabricate large acreage composite structures. However, AFP machines may not be efficient for producing highly contoured structures with tight radii. For example, some conventional rollers of AFP machines are often fabricated from metal (e.g., stainless steel). The metal rollers lack the conformability or flexibility necessary to fabricate complex contoured surfaces. In view of the foregoing, some conventional rollers of AFP machines utilize a soft polymer (e.g., polyurethane). While these soft polymer rollers exhibit the conformability needed for complex contoured surfaces, they lack the thermal conductivity to efficiently dissipate heat, particularly during high temperature layups, thereby resulting in roller wraps. Poor heat dissipation may also lead to roller degradation, thereby introducing foreign object debris (FOD) to the part.

What is needed, then, are compositions for compliant rollers of AFP machines having improved properties and methods for the same.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a composition including a polyamide. The polyamide may be a polymeric reaction product of an aromatic dicarboxylic acid, a hydroxy benzoic acid, or their respective ester or acyl halide derivatives, and at least one diamine. The at least one diamine may include an amino terminated perfluorinated alkyl ether polymer or oligomer. The composition may include a thermal conductivity of from about 0.2 to about 50 Watts per meter Kelvin ($Wm^{-1}K^{-1}$).

In at least one implementation, that at least one diamine may include a phenylenediamine.

In at least one implementation, the phenylenediamine may include one or more of m-phenylenediamine, p-phenylenediamine, or combinations thereof.

In at least one implementation, the amino terminated perfluorinated alkyl ether polymer or oligomer may be represented by one or more of structures (1), (2), (3), (4), (5), (6), (7), (8), or combinations thereof.

In at least one implementation, the amino terminated perfluorinated alkyl ether polymer or oligomer may be represented by one or more of structures (1), (2), or combinations thereof.

In at least one implementation, the amino terminated perfluorinated alkyl ether polymer or oligomer may be represented by structure (3).

In at least one implementation, the amino terminated perfluorinated alkyl ether polymer or oligomer may be represented by one or more of structures (4), (5), or combinations thereof.

In at least one implementation, the amino terminated perfluorinated alkyl ether polymer or oligomer may be represented by one or more of structures (6), (7), or combinations thereof.

In at least one implementation, the amino terminated perfluorinated alkyl ether polymer or oligomer may be represented by structure (8).

In at least one implementation, the at least one diamine may be present in an amount of from greater than 0 weight % to about 20 weight %, by total weight of the diamines utilized in the synthesis of the polyamide In at least one implementation, the composition may further include one or more thermally conductive fillers. The thermally conductive fillers may include one or more of a carbon-based filler, boron nitride, a metal, or combinations thereof.

In at least one implementation, the thermally conductive fillers may include the carbon-based filler. The carbon-based filler may include one or more of expanded graphite, carbon fibers, carbon nanotubes, carbon black, graphite, graphene, derivatives thereof, or combinations thereof.

In at least one implementation, the carbon-based filler may include the carbon fibers. The carbon fibers may include one or more of carbon nanofibers, metallized carbon nanofibers, vapor grown carbon nanofibers, or combinations thereof.

In at least one implementation, the carbon fibers may include the metallized carbon nanofibers. The metallized carbon nanofibers may include carbon nanofibers coated or covalently bound with one or more of silver, copper, nickel, or combinations thereof.

In at least one implementation, the thermally conductive fillers may include the carbon-based filler. The carbon-based filler may be functionalized with one or more of a conductive metal, an aliphatic group, or combinations thereof.

In at least one implementation, the thermally conductive fillers may include the carbon-based filler. The carbon-based filler may include carbon nanotubes. The carbon nanotubes may include one or more of multi-walled carbon nanotubes, single-walled carbon nanotubes, or combinations thereof.

In at least one implementation, the thermally conductive fillers may include the metal. The metal may be in the form of particles, strands, or combinations thereof. The metal may include one or more of aluminum, nickel, or combinations thereof.

The foregoing and/or other aspects and utilities embodied in the present disclosure may be achieved by providing a roller including a composition including a polyamide. The polyamide may be a polymeric reaction product of an aromatic dicarboxylic acid, a hydroxy benzoic acid, or their respective ester or acyl halide derivatives, and at least one diamine. The at least one diamine may include an amino terminated perfluorinated alkyl ether polymer or oligomer. The composition may include a thermal conductivity of from about 0.2 to about 50 Watts per meter Kelvin ($Wm^{-1}K^{-1}$). The roller may have a water contact angle of greater than 95°.

The foregoing and/or other aspects and utilities embodied in the present disclosure may be achieved by providing a compaction roller for an automated fiber placement machine. The compaction roller may include a body having an outer layer. The outer layer of the body may include a composition including a polyamide. The polyamide may be a polymeric reaction product of an aromatic dicarboxylic acid, a hydroxy benzoic acid, or their respective ester or acyl halide derivatives, and at least one diamine. The at least one diamine may include an amino terminated perfluorinated alkyl ether polymer or oligomer. The composition may include a thermal conductivity of from about 0.2 to about 50 Watts per meter Kelvin ($Wm^{-1}K^{-1}$).

The foregoing and/or other aspects and utilities embodied in the present disclosure may be achieved by providing a compaction roller for an automated fiber placement machine. The compaction roller may include a body where the entire body of the compaction roller is fabricated from a composition including a polyamide. The polyamide may be a polymeric reaction product of an aromatic dicarboxylic acid, a hydroxy benzoic acid, or their respective ester or acyl halide derivatives, and at least one diamine. The at least one diamine may include an amino terminated perfluorinated alkyl ether polymer or oligomer. The composition may include a thermal conductivity of from about 0.2 to about 50 Watts per meter Kelvin ($Wm^{-1}K^{-1}$).

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

BRIEF DESCRIPTION OF THE DRAWINGS

The accompanying drawings, which are incorporated in and constitute a part of this specification, illustrate the present teachings and, together with the description, serve to explain the principles of the disclosure. In the FIGURES:

FIG. 1 illustrates a portion of an exemplary automated fiber placement machine, according to one or more embodiments disclosed.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein and in conjunction with a numeral, refers to a value that may be ±0.01% (inclusive), ±0.1% (inclusive), ±0.5% (inclusive), ±1% (inclusive), ±2% (inclusive), ±3% (inclusive), ±5% (inclusive), ±10% (inclusive), or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

Compositions, composites, coatings, layers, and/or articles of manufacture disclosed herein (hereinafter referred to as "materials") may comprise polyamides formed from a polymeric reaction product of an aromatic dicarboxylic acid (e.g., terephthalic acid), aromatic hydroxy benzoic acid (e.g., any one or more of o-hydroxybenzoic acid, m-hydroxybenzoic acid, and/or p-hydroxybenzoic acid) or ester or acyl halide derivatives thereof, and at least one diamine. The polyamides may be formed from the reaction of the aromatic dicarboxylic acid, the aromatic hydroxy benzoic acid, or the ester or acyl halide derivative thereof, and the one or more diamines under any suitable condition, such as under condensation polymerization conditions.

In an exemplary embodiment, the materials may include the polyamides formed from the polymeric reaction product of the aromatic dicarboxylic acid, aromatic hydroxy benzoic acid, or an ester or acyl halide derivative thereof, and the at least one diamine, one or more additional polyamides, one or more additional polymers, one or more thermally conductive fillers, or combinations thereof.

As used herein, the expression "Shore A hardness" may refer to a measure of a hardness of a polymeric material, such as an elastomer, where a relatively higher number indicates a relatively greater resistance to indentation and thus a harder material, and where a relatively lower number indicates a relatively lower resistance to indentation and thus a softer material. The Shore A hardness may be measured with a durometer gauge or tester. It should be appreciated that the Shore A hardness of the materials disclosed herein may relate to a conformability of the materials disclosed herein.

The materials utilizing the compositions disclosed herein may have a Shore A hardness of from about 20 to about 80. For example, the materials disclosed herein may have a Shore A hardness of from about 20, about 30, or about 40 to about 50, about 70, or about 80. In at least one embodiment, the materials disclosed herein may exhibit or have a Shore A hardness of from about 20 to about 80 at temperatures of from about 200° C. to about 500° C. For example, the materials disclosed herein may exhibit or have a Shore A hardness of from about 20 to about 80 at temperatures of from about 200° C., about 250° C., or about 300° C. to about 350° C., about 400° C., or about 500° C.

As used herein, the expression "water contact angle" may refer to the angle that deionized water contacts a surface of the materials disclosed herein. The water contact angle may be measured with any suitable goniometer. The materials disclosed herein may exhibit or have a water contact angle of greater than about 85°, greater than about 90°, greater than about 95°, or greater than about 100°. It should be appreciated that the water contact angle may relate to the anti-stick, non-stick, or otherwise the adhesion properties of the materials disclosed herein. The water contact angle may also relate to surface energy of the material.

In at least one embodiment, the materials disclosed herein may exhibit relatively low surface energies of from about 25 mN/m or less, for example, from about 0.1 to about 25 mN/m, about 0.1 to about 20 mN/m, from about 0.5 mN/m to about 15 mN/m, or about 0.5 mN/m to about 5 mN/m.

As used herein, the expression "thermal conductivity" may refer to an ability of a material to conduct heat. The materials disclosed herein may have a thermal conductivity of from about 0.2 to about 50 Watts per meter Kelvin ($Wm^{-1}K^{-1}$). For example, the materials may have a thermal conductivity of from about 0.2 $Wm^{-1}K^{-1}$, about 1 $Wm^{-1}K^{-1}$, about 5 $Wm^{-1}K^{-1}$, or about 10 $Wm^{-1}K^{-1}$ to about 20 $Wm^{-1}K^{-1}$, about 30 $Wm^{-1}K^{-1}$, about 40 $Wm^{-1}K^{-1}$, or about 50 $Wm^{-1}K^{-1}$.

The materials disclosed herein may have a tensile strength of from about 500 psi to about 4,000 psi. For example, the materials disclosed herein may have a tensile strength of from about 500 psi, about 1000 psi, about 1500 psi, or about 2000 psi to about 2500 psi, about 3000 psi, or about 4000 psi.

The dicarboxylic acid may be or include, but is not limited to, one or more of ortho-phthalic acid, meta-phthalic acid, para-phthalic acid, and/or combinations thereof. Other dicarboxylic acids may include but are not limited to naphthalene-2,6-dicarboxylic acid, naphthalene-1,4-dicarboxylic acid, biphenyl-4,4'-dicarboxylic acid, diphenyl sulfone-4,4'-dicarboxylic acid, pyridine-2,6-dicarboxylic acid, 2,5-furan dicarboxylic acid, and/or combinations thereof. Likewise, methyl or ethyl ester derivatives of these dicarboxylic acids are included as well as acyl halide derivatives of these dicarboxylic acids. The use of these aromatic dicarboxylic acids and their ester and acyl halide derivatives are well-established in the synthesis of polyamides.

The at least one diamine for forming the polyamides may be or include one or more of a phenylenediamine, an amino terminated perfluorinated alkyl ether polymer or oligomer, or combinations thereof. In at least one embodiment, the at least one diamine for forming the polyamides includes a combination of a phenylenediamine and an amino terminated perfluorinated alkyl ether polymer or oligomer.

The phenylenediamine may be or include one or more of o-phenylenediamine, m-phenylenediamine, p-phenylenediamine, or combinations thereof. In an exemplary embodiment, the phenylenediamine includes or predominantly includes p-phenylenediamine.

The amino terminated perfluorinated alkyl ether polymer or oligomer of the diamine may be included as a surface modifying agent. The amino terminated perfluorinated alkyl ether polymer or oligomer of the diamine may include one or more of structures (1), (2), (3), (4), (5), (6), (7), (8), or combinations thereof:

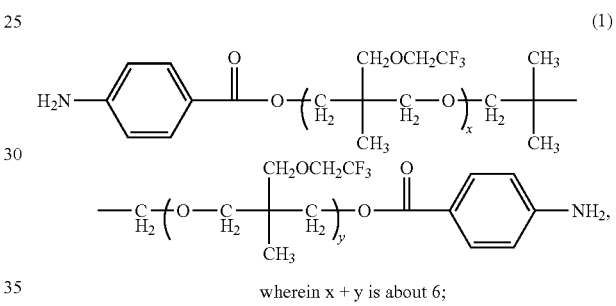

wherein x + y is about 6;

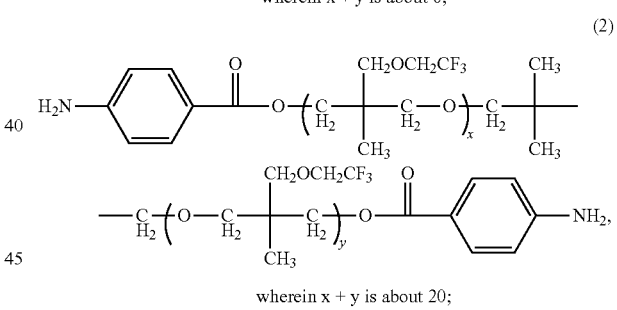

wherein x + y is about 20;

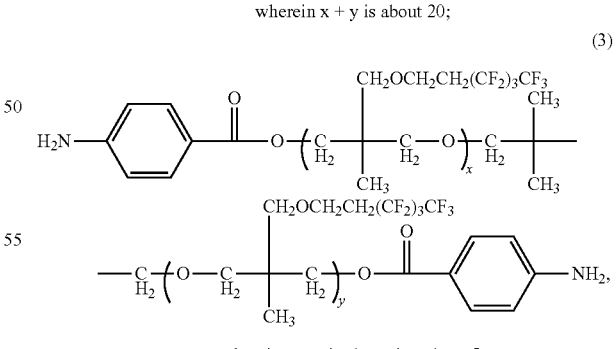

wherein x + y is about 4 to about 5;

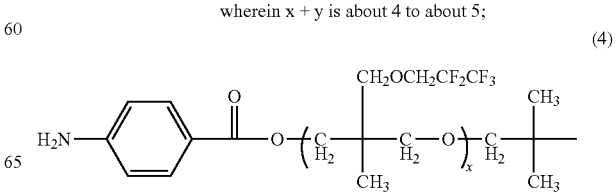

-continued

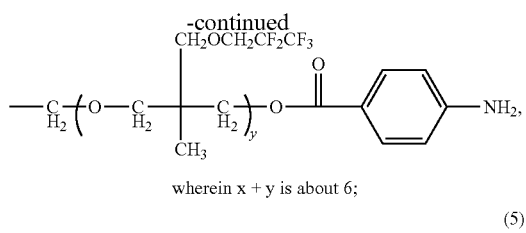

wherein x + y is about 6;

(5)

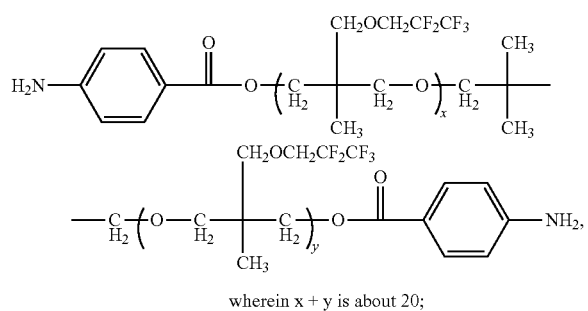

wherein x + y is about 20;

(6)

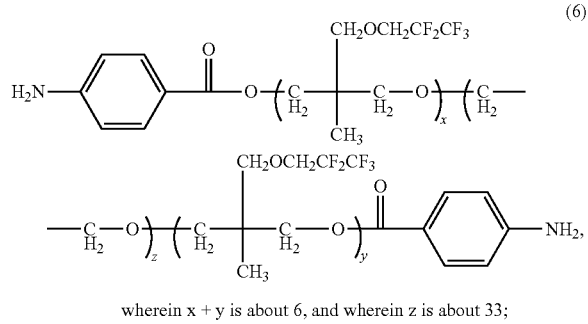

wherein x + y is about 6, and wherein z is about 33;

(7)

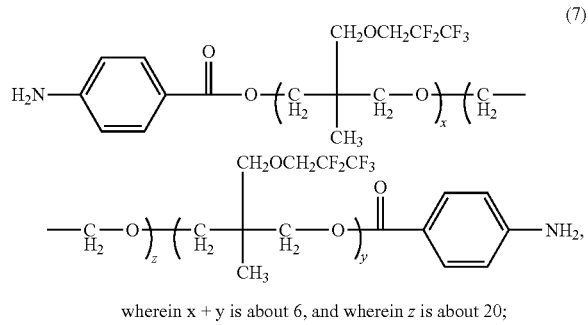

wherein x + y is about 6, and wherein z is about 20;

(8)

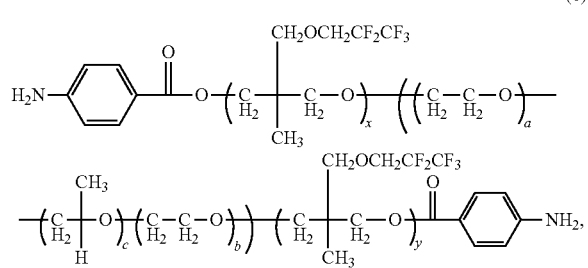

wherein x + y is about 6, a + b is about 22, and c is about 16.

The fluorine-containing portions or segments of the amino terminated perfluorinated alkyl ether polymer or oligomer may be available to migrate to an exterior surface (e.g., air surface) of the materials disclosed herein. For example, the fluorine-containing portions or segments of the amino terminated perfluorinated alkyl ether polymer or oligomer may be available to migrate to respective exterior surfaces of the materials during the fabrication or synthesis thereof. The migration of the fluorine-containing portions to the surfaces of the materials may contribute to or facilitate the formation of surfaces with low energy or anti-stick surfaces. The migration of the fluorine-containing portions to the respective surfaces may also allow the materials to exhibit a combination of bulk and surface properties. For example, the migration of the fluorine-containing portions to the respective surfaces of the materials may result in materials that are anisotropic (e.g., chemically anisotropic) relative to a direction along a thickness thereof. As such, it should be appreciated that the migration of the fluorine-containing portions to the respective surfaces may provide selectively fluorinated surfaces that provide relatively low or minimal adhesion (e.g., high water contact surface) while maintaining bulk properties (e.g., mechanical and thermal properties) throughout the compositions, the materials.

The at least one diamine may also include additional diamines, such as aliphatic or aromatic diamines, including diamines containing other hetero atoms. Illustrative additional diamines of the one or more diamines may be or include, but are not limited to, aliphatic diamines such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane; aromatic diamines, for example, phenylenediamine, diaminotoluene, 2,4-diaminomesitylene, 3,5-diethyl-2,6-diaminotoluene, xylylenediamine (in particular, meta-xylylenediamine, para-xylylenediamine), bis(2-aminoethyl)benzene, biphenylenediamine, a diamine having a biphenyl backbone (e.g., 4,4'-diamino-3,3'-ethylbiphenyl), a diamine having a diphenyl alkane backbone [e.g., diaminodiphenylmethane, bis(4-amino-3-ethylphenyl)methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof alicyclic diamine such as 1,3-cyclopentanediamine, 1,4-cyclohexanediamine, and bis(4-amino-3-methylcyclohexyl)methane; an aliphatic amine, such as trimethylenediamine, tetramethylenediamine, penamethylenediamine, hexamethylenediamine, 2,2,4-trimethylhexamethylenediamine, 2,4,4-trimethylhexamethylenediamine, and octamethylenediamine, and an N-substituted aliphatic diamine thereof; and ether diamines such as poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine, 4,4'-oxydianiline; and aminated random or block copolymers of tetrahydrofuran with minor amounts of a second monomer such as ethylene oxide, propylene oxide, methyl tetrahydrofuran, bis[4-(3-aminophenoxy)phenyl]methane, bis[4-(4-aminophenoxy)phenyl]methane, 1,1-bis[4-(3-aminophenoxy)phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[4-(4-aminophenoxy)phenyl]butane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 4,4'-bis(3-aminophenoxy)biphenyl, 4,4'-bis(4-aminophenoxy)biphenyl, bis[4-(3-aminophenoxy)phenyl] ketone, bis[4-(4-aminophenoxy)

phenyl] ketone, bis[4-(3-aminophenoxy)phenyl] sulfide, bis[4-(4-aminophenoxy)phenyl] sulfide, bis[4-(3-aminophenoxy)phenyl] sulfone, bis[4-(4-aminophenoxy)phenyl] sulfone, or combinations thereof.

The at least one diamine may include one or more of the amino terminated perfluorinated alkyl ether polymers or oligomers represented by one or more of structures (1)-(8) or combinations thereof, the one or more phenylenediamines, the one or more additional diamines, or combinations thereof. In at least one embodiment, the amino terminated perfluorinated alkyl ether polymer or oligomer represented by one or more of structures (1)-(8) may be present in an amount of from greater than 0 weight % to less than or equal to 20 weight %, by total weight of the diamines utilized in the synthesis of the polyamide. For example, the amino terminated perfluorinated alkyl ether polymers or oligomers represented by one or more of structures (1)-(8) may be present in an amount of from about 0.1 weight %, about 0.5 weight %, or about 1 weight % to about 3 weight %, about 5 weight %, about 10 weight %, or about 20 weight %, by total weight of the diamines utilized in the synthesis of the polyamide.

The amino terminated perfluorinated alkyl ether polymers or oligomers represented by one or more of structures (1)-(8) may at least partially determine a water contact angle of the materials including the composition or the composite disclosed herein. For example, the amount of the amino terminated perfluorinated alkyl ether polymers or oligomers present may at least partially determine the water contact angle of the materials including the compositions or the composites. As such, it should be appreciated that the amount of the amino terminated perfluorinated alkyl ether polymers or oligomers utilized in the synthesis of the polyamide may be at least partially determined by a desired water contact angle for the materials. In at least one embodiment, the amino terminated perfluorinated alkyl ether polymers or oligomers may be present in an amount of from about from greater than 0 weight % to about 20 weight %, by total weight of the diamines utilized in the synthesis of the polyamide. For example, the amino terminated perfluorinated alkyl ether polymers or oligomers may be present in an amount of from greater than 0 weight %, greater than 1 weight %, or greater than 2 weight % to less than or equal to 20 weight %, less than or equal to 10 weight %, or less than or equal to 5 weight %, by total weight of the diamines utilized in the synthesis of the polyamide. In at least one embodiment, the amount of the amino terminated perfluorinated alkyl ether polymers or oligomers may be sufficient to provide the materials with a water contact angle of at least 85°, at least 90°, or at least 95°.

The polymeric reaction between the aromatic dicarboxylic acid, mono benzoic acid such as hydroxy benzoic acid, or their ester or acyl halide derivatives and the at least one diamine may be conducted in the presence of one or more organic solvents. Illustrative organic solvents may be or include, but are not limited to, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyridine, picoline (e.g., any isomers of methylpyridine), dimethylsulfoxide, dimethylsulfone, tetramethylurea hexamethylphosphoramide, or combinations thereof. The polymeric reaction may be carried out at a temperature of from about 15° C. to about 75° C., or from about 15° C. to about 50° C.

The polymeric reaction may be conducted at any suitable pressure (e.g., ambient pressure). The polymeric reaction may be conducted under a dry inert atmosphere, such as nitrogen, helium, argon, or combinations thereof. It should be appreciated that reaction times of the polymeric reaction may vary, and may be at least partially dependent on one or more of the reactants, solvents, temperature of reaction, or combinations thereof. In at least one embodiment, the polymeric reaction may include heating. For example, heating at a temperature of from about 120° C., about 150° C., or about 200° C. to about 300° C., about 350° C., or about 400° C.

In at least one embodiment, the polymeric reaction product may be or include a block co-polymer. In another embodiment, the polymeric reaction product may be or include a random co-polymer. In another embodiment, the polymeric reaction product may be or include a structure incorporating portions of both a random co-polymer and a block copolymer.

As disclosed above, the materials disclosed herein may include the polyamides formed from the polymeric reaction product of an aromatic dicarboxylic acid or a hydroxy benzoic acid including ester or acyl halide derivatives thereof and the at least one diamine, one or more additional polyamides, one or more additional polymers, one or more thermally conductive fillers, or combinations thereof. The one or more thermally conductive fillers may be capable of or configured to modify one or more properties of the materials incorporating the same. For example, the one or more thermally conductive fillers may be capable of or configured to modify a thermal conductivity of the materials. As such, the thermally conductive fillers may be capable of or configured to increase or improve the dissipation of heat in the materials. Other properties of the materials that may be modified by the thermally conductive fillers may be or include, but are not limited to, one or more of mass, density, volume, tensile strength, flexibility, elasticity, coefficient of thermal expansion, wear resistance, hydrophobicity, surface friction, or combinations thereof. The thermally conductive fillers may have a major dimension of greater than 10 nm, greater than 50 nm, or greater than 100 nm and less than about 5 µm, less than about 500 nm, less than about 200 nm, or less than about 100 nm. Illustrative thermally conductive fillers may be or include, but are not limited to, one or more of a carbon-based filler, inorganic compounds (e.g., boron nitride), a metal, or combinations thereof.

The carbon-based fillers may be or include, but are not limited to, one or more carbon based particles (e.g., nanoparticles), such as expanded graphite, carbon fibers, carbon nanotubes, carbon black, graphite, graphene, carbon nanofibers, derivatives thereof, or combinations thereof.

In at least one embodiment, any one or more of the carbon-based fillers may be functionalized and/or surface treated. For example, the carbon-based fillers may be functionalized with one or more conductive metals, conductive metal oxides, and/or combinations thereof. Illustrative aliphatic groups may be or include, but are not limited to, methyl, ethyl, propyl isomers, butyl isomers, pentyl isomers, including cyclopentane, hexane isomers, including cyclohexane, or other aliphatic derivatives including up to about 12 carbon atoms. Illustrative conductive metals and conductive metal oxides, may be or include, but are not limited to, silver, gold, copper, nickel, palladium, platinum, ruthenium, rhodium, aluminum oxide, nickel oxide, copper oxides, titanium oxides, zinc oxides, other conductive metals or conductive metal oxides, or the like, and/or combinations thereof. Functionalization of the carbon-based fillers may at least partially facilitate the dispersion of the carbon-based fillers within the materials disclosed herein.

The carbon fiber may include one or more of carbon nanofibers (CNFs), metallized CNFs, vapor grown CNFs, and/or combinations thereof. The metallized carbon nanofibers may include CNFs coated and/or covalently bound with one or more metals and/or metal oxides. Illustrative metals and/or metal oxides coated on the CNFs, may be or include, but are not limited to, silver, gold, copper, nickel, palladium, platinum, ruthenium, rhodium, aluminum oxide, nickel oxide, copper oxides, titanium oxides, zinc oxides, other conductive metals or metal oxides, or the like, or combinations thereof. In an exemplary embodiment, the carbon fiber may include silver metallized or coated CNFs, copper metallized or coated CNFs, nickel metallized or coated CNFs, and/or combinations thereof.

The carbon nanotubes may include carbon-based molecules having a generally elongated, hollow, tubular structure. The hollow, tubular structure of the carbon nanotubes may be formed from two-dimensional sheets of hexagonally arrayed carbon atoms having a thickness of a single carbon atom, referred to as graphene. The two-dimensional sheets of graphene may be rolled along various angles to provide the tubular structures of the carbon nanotubes. The two-dimensional sheets of graphene may also form carbon nanotubes with tubular structures having varying diameters. The angles in which the two-dimensional sheets of graphene are rolled and/or the diameter of the resulting tubular structure may determine one or more properties of the carbon nanotubes. For example, the angle in which the two-dimensional sheets of graphene are rolled may determine a chirality or type of the carbon nanotubes that are formed, which may determine, at least in part, whether the carbon nanotubes exhibit metallic or semiconductive properties.

In at least one embodiment, the hollow, tubular structure of the carbon nanotubes may include straight or bent sidewalls and the ends of the tubular structure may be open and/or closed. The carbon nanotubes may be single-walled nanotubes, double-walled nanotubes, and/or multi-walled nanotubes. The carbon nanotubes may be purified carbon nanotubes and/or crude carbon nanotubes (e.g., as synthesized). The carbon nanotubes may be bare or pristine carbon nanotubes and/or functionalized carbon nanotubes. Pristine carbon nanotubes may include carbon nanotubes that have not undergone any surface modifications and/or treatments subsequent to synthesis and/or purification thereof. Functionalized carbon nanotubes may include carbon nanotubes that may have undergone a surface modification and/or treatment such that one or more functional chemical moiety or moieties are associated therewith. For example, functionalized carbon nanotubes may include carbon nanotubes that have undergone a surface modification treatment such that one or more functional chemical moiety or moieties are associated with the sidewalls (i.e., inner and/or outer sidewalls) and/or the ends of the hollow, tubular structure. In at least one embodiment, the carbon nanotubes may be functionalized with the chemical moiety or moieties to modify one or more properties (e.g., mechanical, thermal, electrical, solubility, etc.) thereof.

In at least one embodiment, the thermally conductive fillers may be aligned or substantially aligned with one another within the materials disclosed herein. For example, the carbon nanotubes (or another fiber) may be aligned or substantially aligned with one another within the materials disclosed herein. The carbon nanotubes may be dispersed in the materials such that a longitudinal axis of the tubular structure of the carbon nanotubes (or the fiber) may be aligned or substantially aligned with one another. The alignment or substantial alignment of the carbon nanotubes along the respective longitudinal axes thereof may provide the materials with one or more anisotropic properties. For example, the carbon nanotubes may have increased mechanical strength along the longitudinal axis of the tubular structure as compared to the mechanical strength normal or perpendicular to the longitudinal axis. Accordingly, the alignment or substantial alignment of the carbon nanotubes along the respective longitudinal axes thereof may provide the materials with increased mechanical strength in the direction in which the longitudinal axis of the carbon nanotubes are aligned as compared to the direction normal to the longitudinal axis of the carbon nanotubes. In another embodiment, the carbon nanotubes may not be aligned or substantially aligned with one another within the materials. Instead, the carbon nanotubes may be randomly dispersed and/or entangled with one another. The random dispersion of the carbon nanotubes in the matrix material may provide the materials with increased mechanical strength as compared to the materials without the carbon nanotubes.

The metals of the thermally conductive filler may be in the form of powders, particles, strands, or combinations thereof. Illustrative metals may be or include, but are not limited to, one or more of aluminum, nickel, copper, silver, gold, platinum, iron, cobalt, or the like, or combinations thereof. In an exemplary implementation, the metal of the thermally conductive filler includes nickel nanostrands, aluminum powder, aluminum particles, or combinations thereof.

The inorganic compounds may be or include any inorganic compound capable of or configured to increase the thermal conductivity of the composition, the composites, and/or the articles of manufacture. Illustrative inorganic compounds may be or include, but are not limited to, boron nitride, oxides, such as silica, alumina, titania, yttria, zirconia, molybdenum oxide, iron oxide, or the like, or combinations thereof. The inorganic compounds may be in the form of particles, powders, tubes (e.g., nanotubes, microtubes, etc.), fibers (e.g., nanofibers, microfibers, etc.), or combinations thereof. In an exemplary implementation, the inorganic compounds may include boron nitride, such as boron nitride nanotubes.

The one or more thermally conductive fillers may be present in the materials disclosed herein in an amount of up to about 30 weight %, by weight of the total solids of the materials. For example, the thermally conductive fillers may be present in an amount of from about 0.1 weight %, about 1 weight %, about 5 weight %, or about 10 weight % to about 15 weight %, about 20 weight %, or about 30 weight %, by weight of the total solids of the materials.

The materials disclosed herein may be utilized in a variety of forms, including, but not limited to, fibers, mats (e.g., woven mats or nonwoven mats), cloths, fabrics, moldings, laminates, foams, molded articles, extruded shapes, or the like. The materials disclosed herein may be utilized in the variety of forms for various applications, including, but not limited to, aircraft and aerospace vehicles surfaces, ship hulls, ship surfaces, barge surfaces, oil rig surfaces, pipes, valves and pumps (e.g., interior and exterior), electrical transmission wires and cables, filters, filtration components, electronic components, controlled fluid flow devices, medical implants, automobiles, trucks, motorcycles and boat surfaces, or the like.

In an exemplary embodiment, the materials disclosed herein may be utilized in one or more components of an automated fiber placement (AFP) machine. FIG. 1 illustrates a portion of an exemplary AFP machine 100, according to one or more embodiments. It should be appreciated by one having ordinary skill in the art that the AFP machine 100 illustrated in FIG. 1 may include one or more additional structural elements that are not depicted. As illustrated in FIG. 1, the AFP machine 100 may include a compaction roller 102 and a heat source 104. The compaction roller 102 may be capable of or configured to receive a tape or prepreg 106 from a fiber placement head (not shown) and contact the tape 106 with surfaces 108 of a workpiece or substrate 110. As illustrated in FIG. 1, the substrate 110 may be a contoured substrate. The heat source 104 may be capable of or configured to heat the prepreg 106 and/or the workpiece 110 to facilitate adhesion therebetween.

In an exemplary operation of the AFP machine 100 with continued reference to FIG. 1, the prepreg 106 may be guided to the compaction roller 102 by the fiber placement head (not shown). The heat source 104 may heat the prepreg 106 and/or the substrate 110, and the compaction roller 102 may adhere or otherwise place the prepreg 106 on the surface 108 of the substrate 110. The compaction roller 102 may apply a force in a direction generally towards or normal to the substrate 110 to contact the heated prepreg 106 with the surface 108 of the substrate 110, thereby adhering the prepreg 106 to the substrate 110.

In an exemplary embodiment, the materials disclosed herein may be utilized in the fabrication of the compaction roller 102 of the AFP machine 100. The materials disclosed herein may be utilized in one or more portions of the compaction roller 102. For example, the materials disclosed herein may be utilized as a coating or an outer layer 112 of the compaction roller 102. The materials disclosed herein may also be utilized in the fabrication of substantially all portions or an entire body 114 of the compaction roller 102. The compaction roller 102 may be fabricated from the materials disclosed herein via any suitable process. For example, the compaction roller 102 may be fabricated from the materials disclosed herein by casting, molding, extruding, or the like.

As discussed above, the articles of manufacture fabricated from the materials disclosed herein may exhibit a combination of bulk and surface properties. As further discussed above, the combination of the bulk and surface properties may be at least partially attributed to the migration of the fluorine-containing portions or segments of the fluorine-containing alkyl ethers to respective exterior surfaces or air surfaces of the articles, the presence of any one or more of the thermally conductive fillers, or combinations thereof. In an exemplary embodiment, the compaction rollers 102 fabricated from the materials disclosed herein may exhibit comparable or improved thermal stability, chemical resistance, mechanical elongation, tensile strength, or combinations thereof, as compared to bulk polyamides, while providing relatively low or minimal adhesion (e.g., high water contact angles) at the exterior surfaces and/or the outer layer 112 thereof. In addition to the foregoing, the compaction rollers 102 fabricated from the materials disclosed herein and including the thermally conductive fillers may exhibit improved thermal conductivity that may facilitate the dissipation or dispersion of heat from the compaction roller 102, thereby reducing or eliminating roller wraps during operation of the AFP machine 100. The improved thermal conductivity of the compaction roller 102 may also reduce or eliminate degradation or wear of the compaction roller 102 at operating temperatures (e.g., 250° C. to 400° C. or from about 250° C. to about 500° C.) of the AFP machine 100, thereby reducing instances or occurrences of foreign object debris (FOD) being deposited onto the substrate 110.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A composition, comprising a polyamide, wherein the polyamide is a polymeric reaction product of at least one diamine and an aromatic dicarboxylic acid, a hydroxy benzoic acid, or their respective ester or acyl halide derivatives, wherein the at least one diamine comprises an amino terminated perfluorinated alkyl ether polymer or oligomer represented by one or more of structures (1), (2), (3), (4), (5), (6), (7), (8), or a combination thereof:

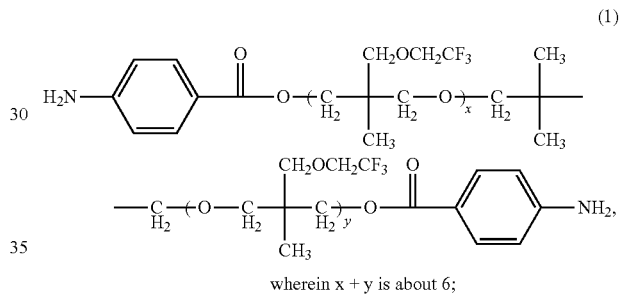

wherein x + y is about 6;

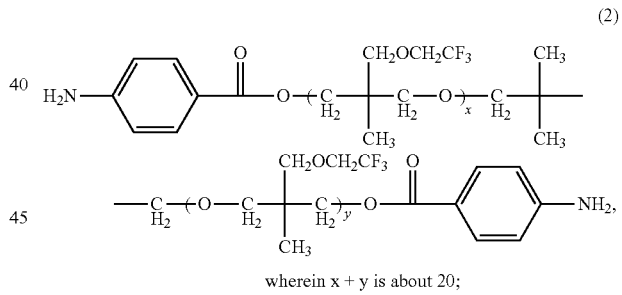

wherein x + y is about 20;

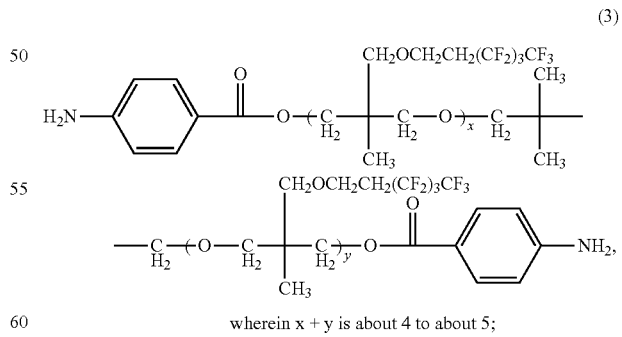

wherein x + y is about 4 to about 5;

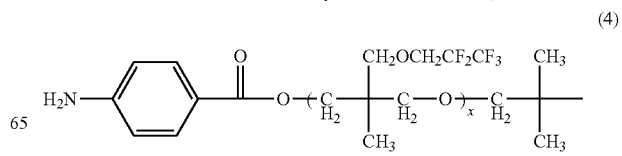

-continued

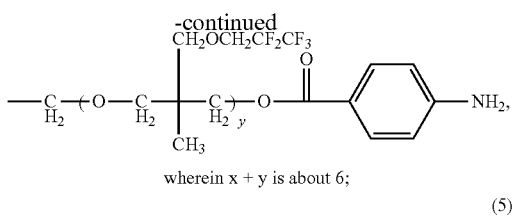

wherein x + y is about 6;                                                    (5)

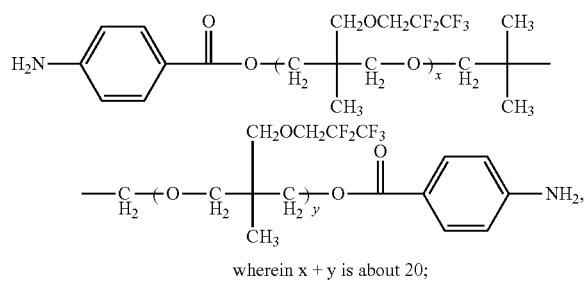

wherein x + y is about 20;                                                   (6)

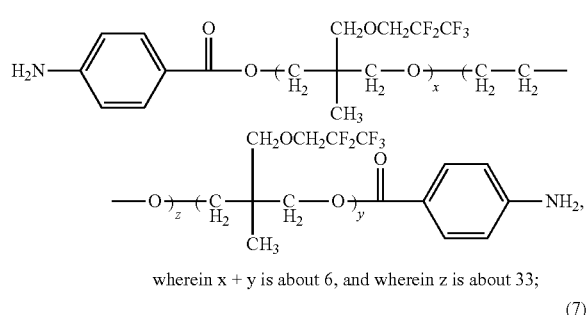

wherein x + y is about 6, and wherein z is about 33;                         (7)

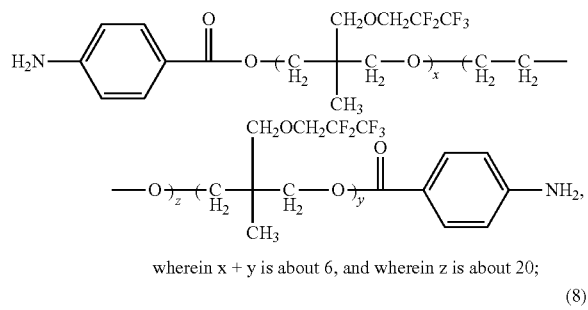

wherein x + y is about 6, and wherein z is about 20;                         (8)

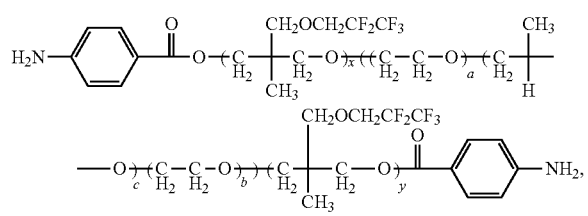

wherein x + y is about 6, a + b is about 22, and c is about 16, (8) wherein x+y is about 6, a+b is about 2, and c is about 16 and
wherein the composition comprises a thermal conductivity of from about 0.2 to about 50 Watts per meter Kelvin (Wm$^{-1}$K$^{-1}$).

2. The composition of claim 1, wherein the at least one diamine further comprises a phenylenediamine.

3. The composition of claim 2, wherein the phenylenediamine comprises one or more of m-phenylenediamine, p-phenylenediamine, or combinations thereof.

4. The composition of claim 3, wherein the phenylenediamine comprises a m-phenylenedi amine.

5. The composition of claim 1, wherein the amino terminated perfluorinated alkyl ether polymer or oligomer is represented by one or more of structures (1), (2), or combinations thereof.

6. The composition of claim 1, wherein the amino terminated perfluorinated alkyl ether polymer or oligomer is represented by structure (3).

7. The composition of claim 1, wherein the amino terminated perfluorinated alkyl ether polymer or oligomer is represented by one or more of structures (4), (5), or combinations thereof.

8. The composition of claim 1, wherein the amino terminated perfluorinated alkyl ether polymer or oligomer is represented by one or more of structures (6), (7), or combinations thereof.

9. The composition of claim 1, wherein the amino terminated perfluorinated alkyl ether polymer or oligomer is represented by structure (8).

10. The composition of claim 1, wherein the amino terminated perfluorinated alkyl ether polymer or oligomer is present in an amount of from greater than 0 weight % to about 20 weight %, by total weight of at least one diamine utilized in the synthesis of the polyamide.

11. The composition of claim 1, further comprising one or more thermally conductive fillers, wherein the thermally conductive fillers comprise one or more of a carbon-based filler, boron nitride, a metal, or combinations thereof.

12. The composition of claim 11, wherein the thermally conductive fillers comprise the carbon-based filler, wherein the carbon-based filler comprises one or more of expanded graphite, carbon fibers, carbon nanotubes, carbon black, graphite, graphene, derivatives thereof, or combinations thereof.

13. The composition of claim 12, wherein the carbon-based filler comprises the carbon fibers, wherein the carbon fibers comprise one or more of carbon nanofibers, metallized carbon nanofibers, vapor grown carbon nanofibers, or combinations thereof 14. The composition of claim 13, wherein the carbon fibers comprise the metallized carbon nanofibers, wherein the metallized carbon nanofibers comprise carbon nanofibers coated or covalently bound with one or more of silver, copper, nickel, or combinations thereof.

15. The composition of claim 11, wherein the thermally conductive fillers comprise the carbon-based filler, and wherein the carbon-based filler is functionalized with one or more of a conductive metal, an aliphatic group, or combinations thereof.

16. The composition of claim 11, wherein the thermally conductive fillers comprise the carbon-based filler, wherein the carbon-based filler comprises carbon nanotubes, wherein the carbon nanotubes comprise one or more of multi-walled carbon nanotubes, single-walled carbon nanotubes, or combinations thereof.

17. The composition of claim 11, wherein the thermally conductive fillers comprise the metal, wherein the metal is in the form of particles, strands, or combinations thereof, and wherein the metal comprises one or more of aluminum, nickel, or combinations thereof.

18. A roller comprising the composition of claim 1, wherein the roller comprises a water contact angle of greater than 95°48.

19. A compaction roller for an automated fiber placement machine, the compaction roller comprising a body having an outer layer, wherein the outer layer of the body comprises the composition of claim 1.

20. A compaction roller for an automated fiber placement machine, the compaction roller comprising a body, wherein the entire body of the compaction roller is fabricated from the composition of claim 1.

\* \* \* \* \*